(12) United States Patent
Seo

(10) Patent No.: US 9,376,150 B2
(45) Date of Patent: Jun. 28, 2016

(54) AUTOMATIC VACUUM CLEANER

(75) Inventor: Jonghyun Seo, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 1134 days.

(21) Appl. No.: 13/393,029

(22) PCT Filed: Jul. 16, 2010

(86) PCT No.: PCT/KR2010/004666
§ 371 (c)(1),
(2), (4) Date: Feb. 28, 2012

(87) PCT Pub. No.: WO2012/005398
PCT Pub. Date: Jan. 12, 2012

(65) Prior Publication Data
US 2012/0151706 A1    Jun. 21, 2012

(30) Foreign Application Priority Data
Jul. 6, 2010  (KR) .......................... 10-2010-0065082

(51) Int. Cl.
*A47L 9/28*     (2006.01)
*B62D 57/024*   (2006.01)
*A47L 1/03*     (2006.01)

(52) U.S. Cl.
CPC ............... *B62D 57/024* (2013.01); *A47L 1/03* (2013.01); *A47L 2201/04* (2013.01)

(58) Field of Classification Search
CPC ....... B62D 57/04; A47L 1/03; A47L 2201/04
USPC .......................................................... 15/319
IPC ....................................................... A47L 9/28
See application file for complete search history.

(56) References Cited

U.S. PATENT DOCUMENTS

| 5,650,702 A * | 7/1997 | Azumi | .................. A47L 9/2815 |
| | | | 15/340.1 |
| 8,924,019 B2 * | 12/2014 | Tang | .................... G05D 1/0246 |
| | | | 134/18 |
| 2005/0192707 A1 * | 9/2005 | Park et al. | ...................... 700/259 |
| 2012/0169497 A1 * | 7/2012 | Schnittman | ............ A47L 9/106 |
| | | | 340/540 |

FOREIGN PATENT DOCUMENTS

| JP | 2000-353014 | 12/2000 |
| JP | 2009-219831 | 10/2009 |
| KR | 20-0342512 | 2/2004 |
| KR | 10-2006-0032876 | 4/2006 |
| KR | 10-0823006 | 4/2008 |

OTHER PUBLICATIONS

International Search Report issued in PCT Application No. PCT/KR2010/004666 dated Aug. 23, 2011.

* cited by examiner

*Primary Examiner* — David Redding
(74) *Attorney, Agent, or Firm* — KED & Associates, LLP (57) ABSTRACT

The present invention relates to an automatic vacuum cleaner. According to an aspect of the present invention, the automatic vacuum cleaner includes a first movement part and a second movement part capable of together moving along an inclined cleaning surface, a movement unit provided in at least one of the first movement part and the second movement part, a cleaning member provided in at least one of the first movement part and the second movement part, and a detection unit which detects states of the cleaning surface, wherein movement speeds of the first movement part and the second movement part are varied according to the states of the cleaning surface.

4 Claims, 11 Drawing Sheets

AUTOMATIC VACUUM CLEANER

CROSS-REFERENCE TO RELATED PATENT APPLICATIONS

This application is a U.S. National Stage Application under 35 U.S.C. §371 of PCT Application No. PCT/KR2010/004666, filed Jul. 16, 2010, which claims priority to Korean Patent Application No. 10-2010-0065082, filed Jul. 6, 2010, whose entire disclosures are incorporated herein by reference.

BACKGROUND OF THE INVENTION

1. Technical Field

The present invention relates to an automatic vacuum cleaner.

2. Description of the Related Art

In general, an automatic vacuum cleaner cleans while driving a floor surface of homes or buildings.

The driving force for driving the automatic vacuum cleaner can be generated by a driving motor.

Since the floor surface forms the flat ground, the automatic vacuum cleaner can be smoothly traveling by the driving motor.

However, the traveling of the automatic vacuum cleaner may be limited, when cleaning an inclined surface, not a flat surface that is, the inclined surface having upward or downward slope in a forward direction.

In particular, when the cleaning surface is a window provided in the building, the use of the automatic vacuum cleaner is very limited. Accordingly, in actual circumstances, the window should be manually cleaned by the user.

In addition, in recent years, high rise buildings have considerably increased. Due to the risk of cleaning the window, it is very limited that the high-rise building's occupants directly clean the window is very limited. Accordingly, specialized companies to clean the window have emerged.

However, there is a problem that an automatic vacuum cleaner capable of automatically cleaning a cleaning surface obliquely or vertically disposed against a ground such as a window does not existed in the related art.

Even when cleaning the window through specialized companies, since the workers should clean the window by depending on ropes fixed in the roof of the building, and the like while moving, there are problems that many personnel and equipments are required.

In addition, there are problems that since cleaning object's areas are wider, parts be not touched by worker's hand are existed and risks for safety of workers are always existed.

SUMMARY OF THE INVENTION

The object of the present invention is to provide an automatic vacuum cleaner movably attached to a cleaning surface to perform cleaning operations.

The another object of the present invention is to provide an automatic vacuum cleaner in which operation manners can be varied according to the foreign material amounts based on states of the cleaning surface.

According to an aspect of the present invention, the automatic vacuum cleaner includes a first movement part and a second movement part capable of together moving along an inclined cleaning surface, a movement unit provided in at least one of the first movement part and the second movement part, a cleaning member provided in at least one of the first movement part and the second movement part, and a detection unit which detects states of the cleaning surface, wherein movement speeds of the first movement part and the second movement part are varied according to the sates of the cleaning surface.

According to another aspect of the present invention, the automatic vacuum cleaner includes a first movement part and a second movement part capable of together moving along an inclined cleaning surface; a movement unit provided in at least one of the first movement part and the second movement part; a cleaning member provided in at least one of the first movement part and the second movement part; a detection unit which detects states of the cleaning surface; a driving unit which drives the cleaning member, wherein operation manners of the driving unit are varied according to the sates of the cleaning surface.

DESCRIPTION OF THE PREFERRED EMBODIMENTS

Hereinafter, the preferred embodiments of the present invention will be described with reference to accompanying drawings in detail.

In addition, in the explanation of the embodiments of the present invention, terms such as a first, a second, A, B, (a), (b) and the like may be used. These terms are only intended to distinguish components each other, and the nature, the difference, the order and the like of the components are not limited. In addition, when an element is referred to as being "connected", "coupled" or "connection" another element, it can be directly connected to another element or be indirectly connected to another element, but it should be understand that each of these elements or another elements can be connected or coupled therebetween.

Figure 1:
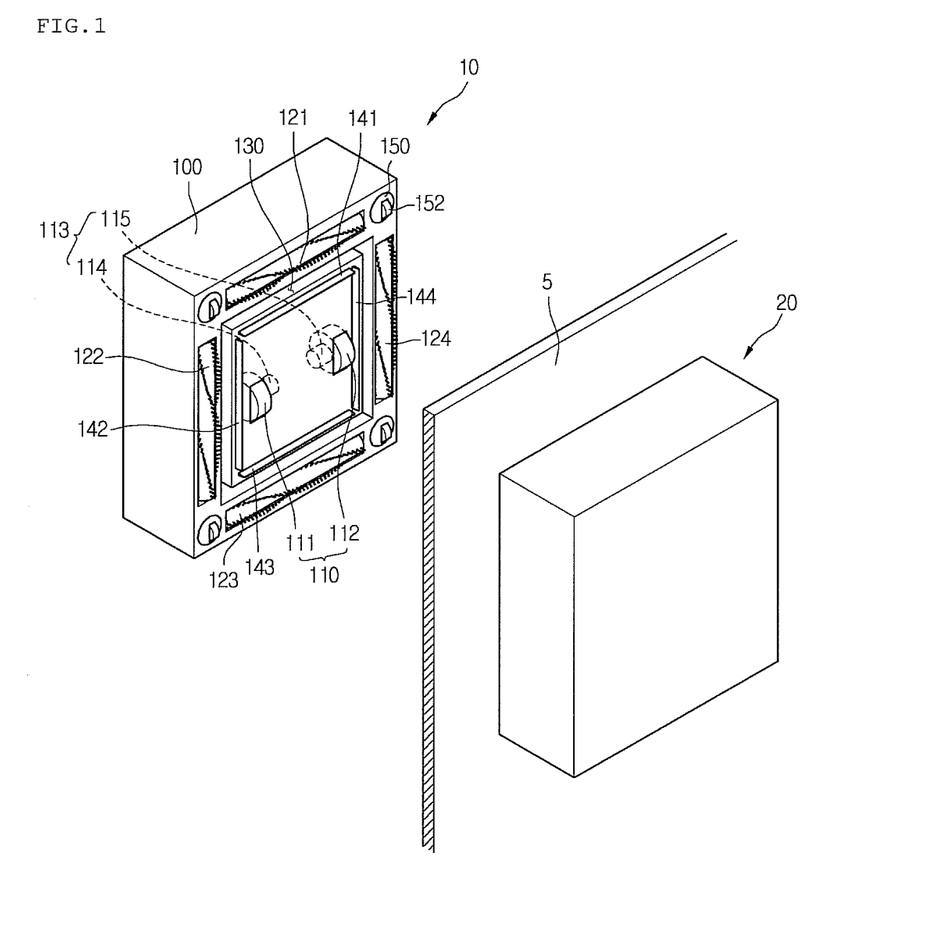
FIG. 1 is a perspective view illustrating an automatic vacuum cleaner according to a first embodiment of the present invention.
Figure 2:
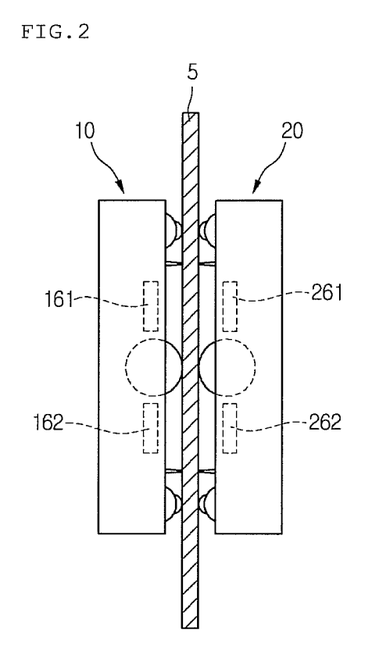
FIG. 2 is a diagram illustrating an appearance that an automatic vacuum cleaner is attached to a cleaning surface according to the first embodiment of the present invention.

FIG. 1 is a perspective view illustrating an automatic vacuum cleaner according to a first embodiment of the present invention; and FIG. 2 is a diagram illustrating an appearance that an automatic vacuum cleaner is attached to a cleaning surface according to the first embodiment of the present invention.

Referring to FIGS. 1 and 2, according to the embodiment, the automatic vacuum cleaner includes a first movement part 10 and a second movement part 20. In a state where the first movement part 10 is contacted with one surface of a cleaning object 5, when the second movement part 20 is contacted with another surface of the cleaning object, positions of the first movement part 10 and the second movement part 20 can be fixed by a force of attraction.

In this case, the cleaning object 5 can be obliquely arranged on the ground (includes verticality), and the ground can be understand as a surface corresponding to a floor surface of buildings or any place.

The first movement part 10 includes a main body 100 forming an external appearance. The main body 100 includes main wheels 110 by which the main body 100 is moved, a first driving unit 113 which rotates the main wheels 110, a first cleaning member and a second cleaning member which cleans the cleaning object 5, an inlet 130 which inlets foreign matters of the cleaning object 5, auxiliary wheels 152 which assists a movement of the main body 100, and at least one of first magnetic members 161, 162.

Since the basic structure of the second movement part 20 is identical to that of the first movement part 10, the configuration of the first movement part 10 can be intactly applied to the second movement part 20. However, in the second movement part 20, the driving motor for rotating the main wheels can be removed. Accordingly, a detailed description of the second movement part 20 is omitted.

The second movement part 20 includes at least one of the second magnetic members 261, 262 that interact with the first magnetic members 161, 162.

Any one of the first magnetic members 161, 162 and the second magnetic members 261, 262 may be permanent magnets or electromagnets and the other one may be metallic. In addition, the first magnetic members 161, 162 and the second magnetic members 261, 262 may be permanent magnets or electromagnets, respectively.

In this case, the magnetic members 161, 162, 261, 262 may be located at the inside or the outside of the movement parts 10, 20. Further, the portion of the magnetic members 161, 162, 261, 262 may be exposed or protruded to the inside or the outside of the movement parts 10, 20.

By the magnetic members 161, 162, 261, 262, the movements parts 10, 20 may be maintain a state attached to the inclined cleaning object 5 by acting an attraction force (magnetic force) between the first movement part 10 and the second movement part 20. That is, in a state where each of the movements 10, 20 is attached to the inclined cleaning object, each of the movement parts 10, 20 may be prevented from falling or sliding downwardly Of course, the attraction force between the first magnetic members 161, 162 and the second magnetic members 261, 262 should have the intensity that each of the movement parts 10, 20 does not fall.

Herein, the magnetic members 161, 162, 261, 262 may refer to an attachment maintaining unit which maintains the state where the each of the movement part is attached to the cleaning object.

The main wheels 110 include a first main wheel 111, and a second main wheel 112 spaced from the first main wheels 111. The first driving unit 113 includes a first motor 114 for rotating the first main wheels 111 and a second motor 115 for rotating the second main wheels 112.

Each of the motors 114, 115 may be independently operated, and regular and irregular rotations (bi-direction rotation) may be performed. Accordingly, RPMs of the first main wheels 111 and the second main wheels 112 may be the same or different.

Accordingly, the first movement part 10 may be rotated, including the forward movement and the backward movement in the cleaning object. That is, when the first movement part 10 is moved, the direction of the movement may be switched. In this case, without the first driving unit for rotating the main wheels of the second movement part 20, the second movement part 20 is moved along with the first movement part 10 by the attraction force for the first movement part 10.

Herein, the main wheels and the first driving unit may refer to a movement unit which moves the movement part.

The first cleaning member may be contacted with the cleaning object 5. The first cleaning member includes a plurality of cleaning elements 121, 122, 123, 124. The plurality of cleaning elements 121, 122, 123, 124 include first cleaning element to fourth cleaning elements. The first cleaning member may be provided to the (portion viewing the cleaning object) movement part 10, 20. In addition, the lower portion of the each first cleaning member may be located adjacent to the lower border of the each movement part.

The first cleaning element 121 and the third cleaning element 123 are arranged in parallel, and the second cleaning element 122 and the forth cleaning element 124 are arranged in parallel. In addition, the first cleaning element 121 and the third cleaning element 123 are orthogonal to the second cleaning element 122 and the forth cleaning element 124.

Each of the cleaning elements 121, 122, 123, 124 may be independently rotated by a second driving unit (see 118 of FIG. 3) described later. In this case, each of the cleaning elements 121, 122, 123, 124 may vertically rotated over the cleaning surface of the cleaning object 5. That is, the rotation axis of each of cleaning elements 121, 122, 123, 124 is parallel to the cleaning surface.

In addition, each of the cleaning elements 121, 122, 123, 124 is rotated to be move foreign materials from the outside to the inside of each movement part 10, 20.

The inlet 130 is spaced from the first cleaning member and located on the inside than the first cleaning member. That is, the distance from the center of the movement part 10, 20 to the inlet 130 is shorter than that from the center of the movement part 10, 20 to the first cleaning member.

The foreign materials of the cleaning object may be inlet into the inlet 130. In this case, the movement parts 10, 20 may be provided with a suction motor (see 188 of FIG. 3) for generating suction force and a dust container (not shown) storing the inlet dust.

In addition, the second cleaning member is spaced from the inlet 130 and located the inside than the inlet 130 That is, the first cleaning member, the inlet 130 and the second cleaning member are sequentially located from the outside to the inside of the movement parts 10. 20.

In addition, the second cleaning member may be also contacted with the cleaning object 5. The second cleaning member includes a plurality of cleaning elements 141, 142, 143. 144. The plurality of cleaning elements 141, 142, 143, 144 include first cleaning element to fourth cleaning elements.

The first cleaning element 141 and the third cleaning element 143 are arranged in parallel, and the second cleaning element 142 and the forth cleaning element 144 are arranged in parallel. In addition, the first cleaning element 141 and the third cleaning element 143 are orthogonal to the second cleaning element 142 and the forth cleaning element 144.

Each of the cleaning elements 141, 142, 143, 144 may be formed of rubber materials as an example. When each of the movement parts 10, 20 is moved, the each of the cleaning elements 141, 142, 143, 144 is slid and cleaned in a state be contacted with the cleaning object.

Meanwhile, the lower portion of the movement parts 10, 20 is provided with at least one caster 150 capable of rotating based on the rotation shaft perpendicular to the lower surface of the movement parts 10, 20. In addition, the caster 150 is disposed with the auxiliary wheels 152.

In addition, any one of the first movement part 10 and the second movement part 20 may be located on the inside of the room, and the other one may be located on the outside of the room. Accordingly, since the movement part located on the inside of the room may be changed, each of the movement parts 10, 20 may be provided with an input unit for inputting operation commands (start command, operation patterns, etc.) Each of the movement parts may be provided with a communication unit, and signal input from the any one of the movement parts may be transmitted to the other movement part through the communication unit.

Figure 3:
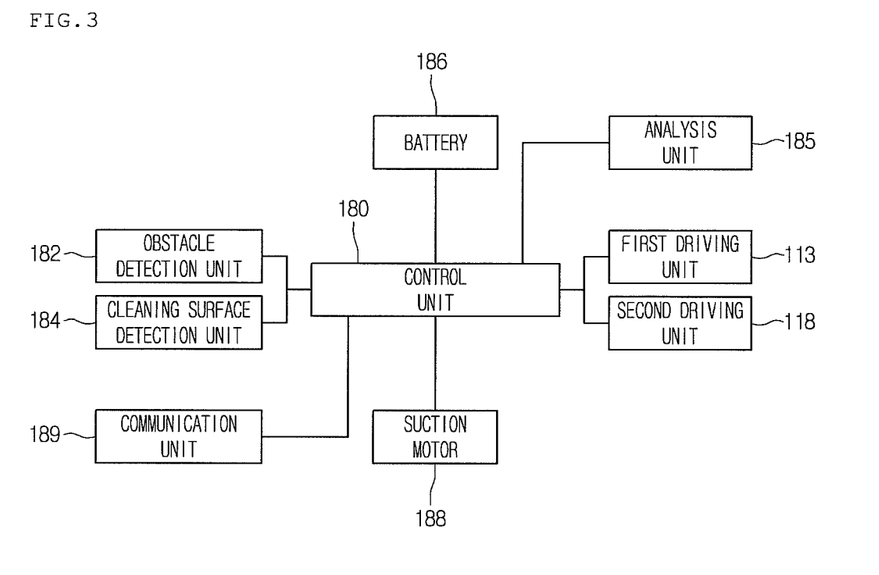
FIG. 3 is a block diagram illustrating a first movement part of the first embodiment of the present invention.
Figure 4:
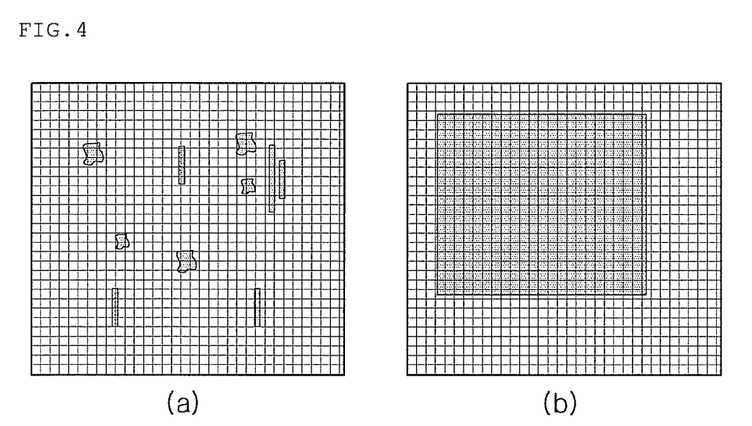
FIG. 4 is a diagram illustrating a cleaning surface state detected in a cleaning surface detection unit.

FIG. 3 is a block diagram illustrating a first movement part of the first embodiment of the present invention; and FIG. 4 is a diagram illustrating a cleaning surface state detected in a cleaning surface detection unit First, referring to FIG. 3, the first movement part includes a control unit 180, an obstacle detection unit 182 which detects obstacles, a cleaning surface detection unit 184 which detects cleaning surface states, an analysis unit 185 which analyzes the cleaning surface states, a battery 186 which supplies power, a first driving unit 113 which drives the main wheels 110, a second driving unit 118 which drives the first cleaning member, a suction motor 188 which generates suction force, and a communication unit 189 which communicates with the second movement part 20.

Although not shown in the drawings, but the second movement part 20 includes at least one of the communication unit, the control unit, the battery, the second driving unit and the suction motor.

In detail, the second driving unit 118 includes a plurality of motors. The number of the plurality of motors may be equal to the number the plurality of cleaning elements 121, 122, 123. 124 composed of the first cleaning member. Accordingly, the whole or portion of the cleaning elements 121, 122, 123, 124 may be operated and the rotation number of each of the cleaning elements 121, 122, 123, 124 may be different.

In addition, the second driving unit 118 includes a single motor, and power of the single motor may be transmitted to the cleaning elements 121, 122, 123, 124 by a power transmission unit. In this case, the operation information (control information) of the second driving unit 118 of the first movement part 10 may be sent to the second movement part 20. Then, the second driving unit of the second movement part 20 operates with the pattern identical with the second driving unit 118 of the first movement part 10.

The obstacle detection unit 182 may include at least one of the first movement part 10 and the second movement part 20. The obstacle detection unit 182 may be used by a variety of sensors such as an infrared sensor, an ultrasonic sensor and the like. In the embodiment, it is noted that the kind of the obstacle detection unit 182 is not restrictive.

The cleaning surface detection unit 184 may be a camera as an example. The cleaning surface detection unit 184 may be located on the side of the first movement part 10. The cleaning surface detection unit 184 may include a plurality of numbers.

Any one of the plurality of cleaning surface detection units 184 may be provided to the first side parallel to the axis of the main wheels and the other one of cleaning surface detection units 184 may be provided to the second side parallel to the axis of the main wheels.

Since the first movement part 10 can go forward or backward, when going forward, any one of cleaning surface detection units 184 detects the cleaning surface state, and when going backward, the other one of cleaning surface detection units 184 detects the cleaning surface state.

In the embodiment, the cleaning surface detected by the cleaning surface detection unit 184 is a surface (a cleaning surface to be afterward moved by the first movement part) that has not yet been cleaned.

When the cleaning surface detection unit 184 photographs the cleaning surface, the analysis unit 185 analyzes the captured image and transmits the analyzed results to the control unit 180. Then, the control unit 180 may control the operations of the first driving unit 113 and/or the second driving unit 118 according to the analyzed results.

Referring to FIGS. 4A and 4B, the image photographed from the cleaning surface detection unit 184 may be different contrast according whether foreign materials are existed. The analysis unit 185 divides the photographed image into a plurality of pixels. In addition, when different contrast in each pixel is existed more than one, it is determined that the foreign materials are existed in the pixel. For an example, when determined that foreign materials are existed in the pixel, the corresponding pixel is given by 1, and when determined that foreign materials are not existed in the pixel, the corresponding pixel is given by 0.

Figure 5:
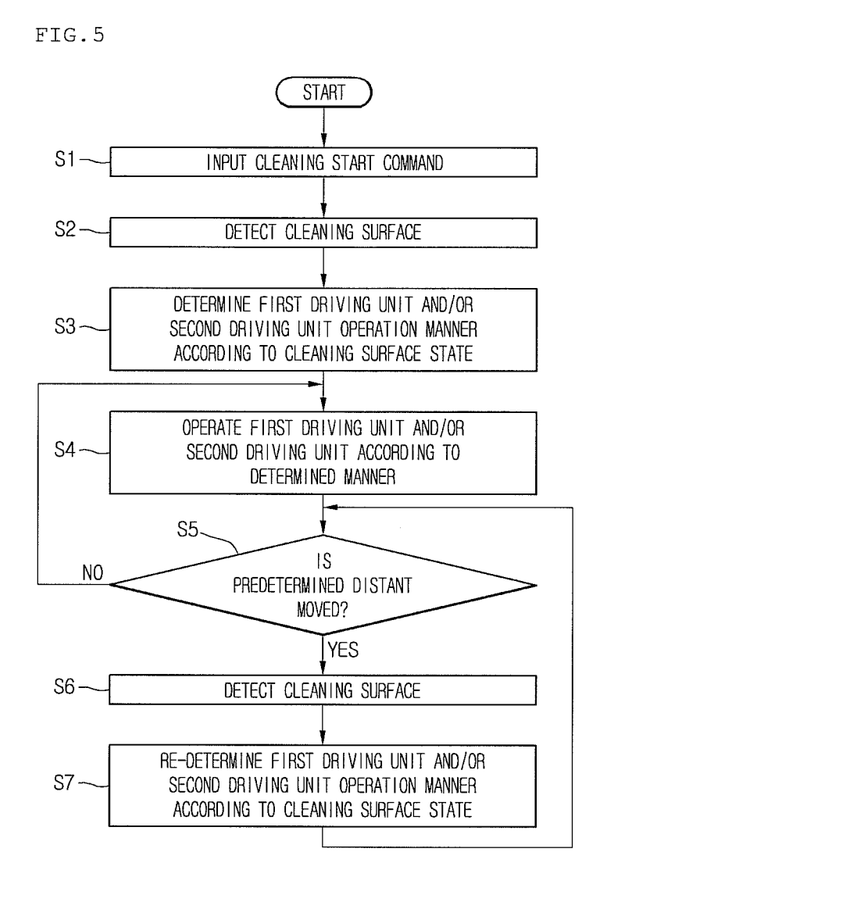
FIG. 5 is a flow chart illustrating a control method of the automatic vacuum cleaner according to the first embodiment of the present invention.

According to the method described above, as shown in FIG. 4B, even when a black or colored advertisement sheet or a awning sheet is attached to or coated on the cleaning surface, it is possible to determine the presence or not and amount of the foreign materials FIG. 5 is a flow chart illustrating a control method of an automatic vacuum cleaner according to the first embodiment of the present invention.

Referring to FIG. 5, in a state where the first movement part 10 and the second movement part 20 are attached to the cleaning object, the start command is inputted to the specific movement part (S1). Then, the cleaning surface detection unit 184 detects the cleaning surface state (S2). In addition, the photographed image from the cleaning surface detection unit is analyzed by the analysis unit 185 and the control unit 180 determines the operation methods of the first driving unit 113 and/or the second driving unit 118 according to the analyzed results.

In the embodiment, until an operation method of the driving units 113, 118 is determined in the control unit 180, the second driving unit 118 can operate in a state where the movement parts 10, 20 are stopped. As an example, the first cleaning member can be rotated at a speed when the smallest amounts of foreign materials are existed. In addition, the operation state of the second driving unit 118 can be maintained or varied according to the analyzed results.

For example, when determined that the foreign material amounts of the cleaning surface are more than the reference amount (for example, in a case where the number of the pixel is greater than the reference value), the control unit 180 generates the operation command of the first driving unit 113 to slow the movement speed of the movement parts 10, 20 than the case that the foreign material amounts are less. In this case, the first cleaning member is rotated at a constant speed regardless of the foreign material amounts. In addition, the movement parts 10, 20 are stopped for a certain period of time while moving the movement parts 10, 20, and a specific cleaning surface can be intensively cleaned.

In addition, when determined that the foreign material amounts are more, the control unit 180 generates the operation command of the second driving unit 118 of the first movement part 10 to increase the rotation speed of the first cleaning member than the case that the foreign material amounts are less. In this case, the movement parts 10, 20 are moved at a constant speed regardless of the foreign material amounts. In addition, information about the operation methods of the second driving unit 118 is transmitted to the second movement part 20 through the communication unit, and the second driving unit can be operated by the same operation methods in the second movement part 20.

In addition, the control unit 180 generates the operation commands of the first driving unit 113 and the second driving unit 118 to increase the rotation speed of the first cleaning member while slowly moving the movement parts 10, 20 than the case that the foreign material amounts are less.

That is, the movement speed of the first movement part 10 can be adjusted to a number of steps and the movement speed of the first movement part 10 is determined according to the amount of foreign materials. In addition, the rotation speed of the first cleaning member can be adjusted to a number of steps and the rotation speed (operation speed) of the first cleaning member is determined according to the amount of foreign materials.

Further, the first driving unit 113 and/or the second driving unit 118 are operated by a predetermined method (S4). Then, the cleaning surface is cleaned while moving the first movement part and the second movement part.

In addition, the movement distances of the movement parts 10, 20 are determined during the movement of the movement parts 10, 20 (S5). As an example, the movement distances of the movement parts 10, 20 are determined by using the number of rotation of the first and second motors 114, 115.

In addition, when determined that the movement parts 10, 20 are moved by a certain distance, the cleaning surface detection unit 184 again detects the cleaning surface to be afterward cleaned (S6). Then, the control unit 180 again determines the operation methods of the first driving unit 113 and/or the second driving unit 118 in response to the newly detected cleaning surface (S7). In this case, the operation methods of the first and/or second driving units 113, 118 can be maintained in the previous state or varied.

Further, the first driving unit 113 and/or the second driving unit 118 are operated by a re-predetermined method.

Figure 7:
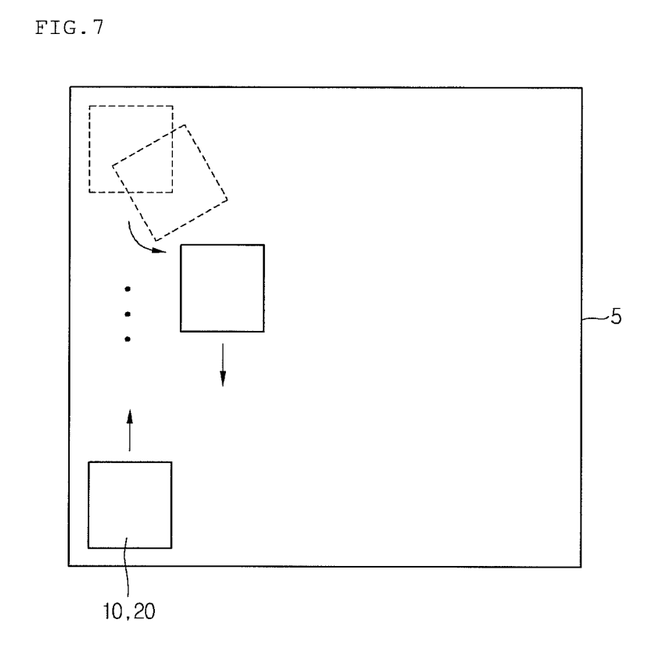
FIG. 7 is a diagram illustrating another example of a direction change method of the automatic vacuum cleaner of the present invention.

In the embodiment, the steps S and FIG. 7 are repeatedly performed during the movement of the movement parts 10, 20.

In the described above, the operation methods of the first driving unit and/or the second driving unit may be varied according to the foreign material amount, but the operation method of the suction motor may be further varied according to the foreign material amount. As an example, the suction motor may be controlled such that the suction force of the suction motor is increased (the suction force may be divided into a number of steps) as the foreign material amounts of the cleaning surface are more existed.

According to the present invention described above, since the plurality of movement part may be moved in a state attached to the cleaning surface by the magnetic force of the magnetic member, there is an advantage that the inclined cleaning surface can be cleaned.

In addition, since the cleaning object is disposed between the plurality of movement parts and the cleaning member is provided between the movement part and the cleaning surface, there is an advantage that the both sides of the cleaning surface can be cleaned.

In addition, since the operations of the driving units 113, 118 can be varied according to the foreign material amounts, there is an advantage that the cleaning performance can be improved.

Figure 6:
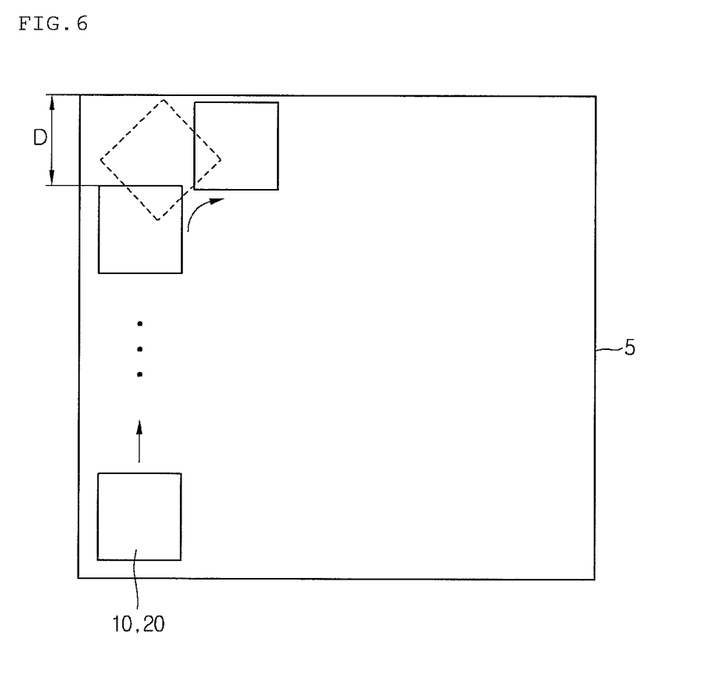
FIG. 6 is a diagram illustrating an example of a direction change method of the automatic vacuum cleaner of the present invention.

FIG. 6 is a diagram illustrating an example of a direction change method of the automatic vacuum cleaner of the present invention; and FIG. 7 is a diagram illustrating another example of a direction change method of the automatic vacuum cleaner of the present invention.

First, referring to FIG. 6, the obstacle detection unit 182 detects whether obstacles (for example, window ledges) are existed during moving the movement parts 10, 20. In addition, the control unit determines the distance between the obstacle and the movement part by using the detected information in the obstacle detection unit 182. In addition, when the distance between the obstacle and the movement part is reached to a certain distance D, the direction of the movement parts 10, 20 is changed. As an example, when the number of rotation of any one motor is increased than the number of rotation of the other motor, the movement parts 10, 20 are rotated towards the driving motor having a relatively large rotation number. In this case, the constant distance may be the minimum distance for not hitting the obstacle when the direction of the movement part is changed.

As another method, referring to FIG. 7, the obstacle detection unit 182 detects whether obstacles (for example, window ledges) are existed during moving the movement parts 10, 20. When the obstacle is detected, the control unit controls such that the first and second motors 114, 115 may be rotated in the opposite direction compared to previous direction. In this case, the motors 114, 115 are controlled such that the number of rotation of any one motor is increased than the number of rotation of the other motor. Then, the movement parts 10, 20 are moved in the opposite direction compared to previous direction and at the same time, the movement parts 10, 20 are moved to a different path deviated from previous movement path, and accordingly, the cleaning surface, which is not performed, may be cleaned.

Figure 8:
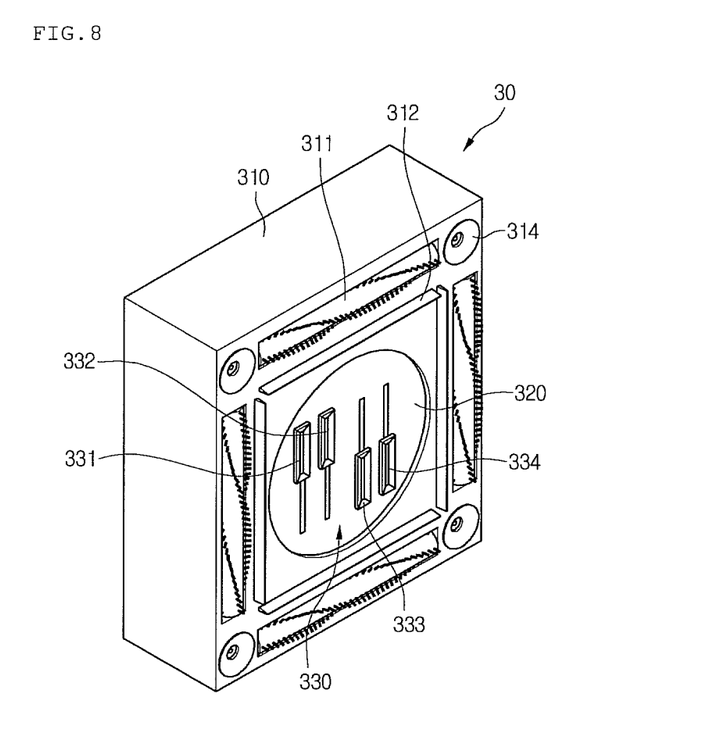
FIG. 8 is a perspective view illustrating an automatic vacuum cleaner according to a second embodiment of the present invention.
Figure 9:
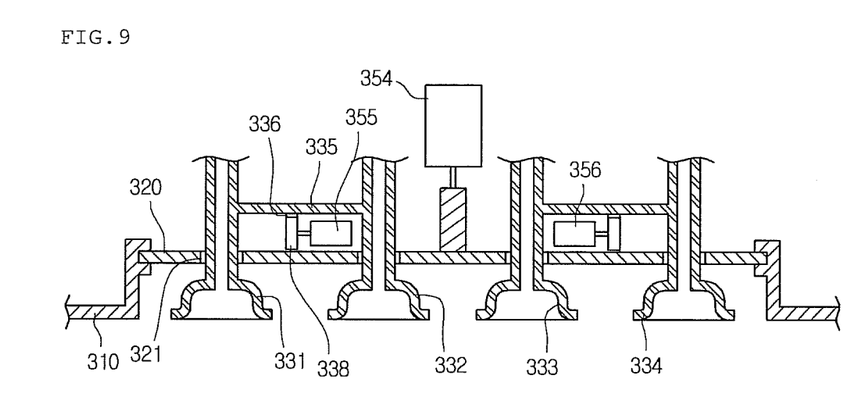
FIG. 9 is a partial cross sectional view illustrating a second main body part of the automatic vacuum cleaner shown in FIG. 8.

FIG. 8 is a perspective view illustrating an automatic vacuum cleaner according to a second embodiment of the present invention; FIG. 9 is a partial cross sectional view illustrating a second main body part of the automatic vacuum cleaner shown in FIG. 8; and FIG. 10 is a block diagram illustrating a configuration of the automatic vacuum cleaner according to the second embodiment of the present invention.

Figure 10:
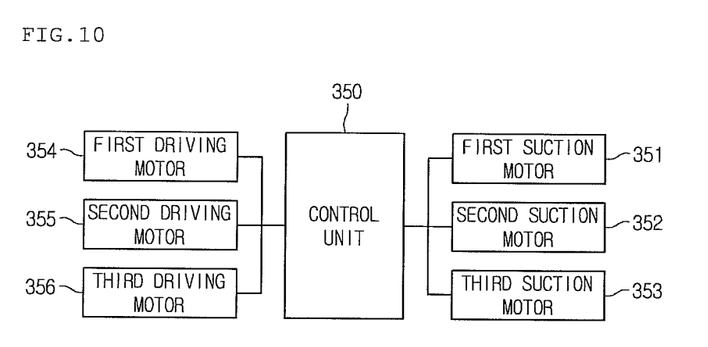
FIG. 10 is a block diagram illustrating a configuration of the automatic vacuum cleaner according to the second embodiment of the present invention.

Referring to FIGS. 8 to 10, according to the embodiment, the automatic vacuum cleaner 30 performs the cleaning in a state attached to one side of the cleaning object.

The cleaner 30 includes a first main body 310 (may be referred to a first movement part), and a second main body 320 (may be referred to a second movement part) relative-operatively connected to the fist main body.

The first main body 310 includes a first cleaning member 311, a second cleaning member 312 and at least one fixed adhesion unit 314. The structures and locations of the first cleaning member 311 and the second cleaning member 312 and the configuration for rotating the first cleaning member 311 are identical with these of the first embodiment. Accordingly, the detailed explanation is omitted. In addition, in this embodiment, the inlet of the first embodiment may be removed or presented. FIG. 8 is showing an example that the inlet is removed.

The fixed adhesion unit 314 may include a plurality of numbers. The fixed adhesion unit 314 communicates with the first suction motor 351.

When the first suction motor 351 is operated, negative pressure is applied to the each fixed adhesion unit 314 and then the each fixed adhesion unit 314 may be adhered to the cleaning object.

The second main body 320 includes a travelling unit 330 (may be referred to movement unit) by which the cleaner 30 can be moved along the cleaning object. The travelling unit 330 may be moved while the vacuum cleaner is attached to the cleaning object.

In detail, the travelling unit 330 includes a first travelling unit and a second travelling unit. The fist travelling unit includes a first adhesion unit 331 and a second adhesion unit 332. The first adhesion unit 331 and the second adhesion unit 332 are communicated with a second suction motor 352.

The second travelling unit includes a third adhesion unit 333 and a fourth adhesion unit 334. The third adhesion unit 333 and the fourth adhesion unit 334 are communicated with a third suction motor 353. Accordingly, the negative pressure may be separately applied to the first travelling unit and the second travelling unit respectively.

Each of the adhesion units 331, 332, 333, 334 and the second main body 320 may be relative-operated by a slot 321 formed in the second main body 320. Of course, each of the adhesion units 331, 332, 333, 334 can be moved (as an example, rotated) along with the second main body 320.

The first adhesion unit 331 and the second adhesion unit 332 are connected to each other through a connection unit 335. In addition, the connection unit 335 is formed with a rack gear 336. The rack gear 336 engages with a pinion gear 338 coupled to the second driving motor 355.

The third adhesion unit 333 and the fourth adhesion unit 334 can be similarly connected to each other through the connection unit and connected to a third driving motor 356 through the rack gear and the pinion gear.

Accordingly, when the second driving motor 355 is operated in a state where the first adhesion unit 331 and the second adhesion unit 332 are adhered to the cleaning object, the first main body 310 and the second main body 320 are moved, except for the first adhesion unit 331 and the second adhesion unit 332. That is, when the second driving motor 355 is operated in a state where the first adhesion unit 331 and the second adhesion unit 332 are shown FIG. 8, the first main body 310 and the second main body 320 are upwardly moved on the basis of FIG. 8.

In order to continuously move the vacuum cleaner 30 upwardly, the third adhesion unit 333 and the fourth adhesion unit 334 should be upwardly moved by the third driving motor 356 in the state where the first adhesion unit 331 and the second adhesion unit 332 are adhered to the cleaning object. Of course, in order to move the third adhesion unit 333 and the fourth adhesion unit 334 upwardly, the third suction motor 353 should be not operated.

Accordingly, the vacuum cleaner can be linearly moved by the travelling unit 330.

Meanwhile, the direction changing of the vacuum cleaner can be performed by the first driving motor 354 in the state where the first adhesion unit 331 is adhered to the cleaning object.

The first driving motor 354 is connected to the second main body 320. Accordingly, when the first driving motor 354 is operated, the second main body 320 can be rotated about the first main body 310 in the state where the first main body 310 is fixed to the cleaning object. That is, the second main body 320 is rotatably connected to the first main body 310.

In addition, when the direction changing of the vacuum cleaner has been completed, the negative pressure applied to the fixed adhesion unit 314 is removed.

Meanwhile, in this embodiment, the automatic vacuum cleaner also includes the cleaning detection unit, and since the analysis unit and the functions and operations are identical with those of the first embodiment, the detail description about those is omitted. However, in this embodiment, the movement speed of the automatic vacuum cleaner may be varied by adjusting the operations of the second driving motor 355, the third driving motor 356, the second suction motor 352 and the third suction motor 353.

In addition, each of the suction motors and the driving motor can be controlled by the control unit 350.

Figure 11:
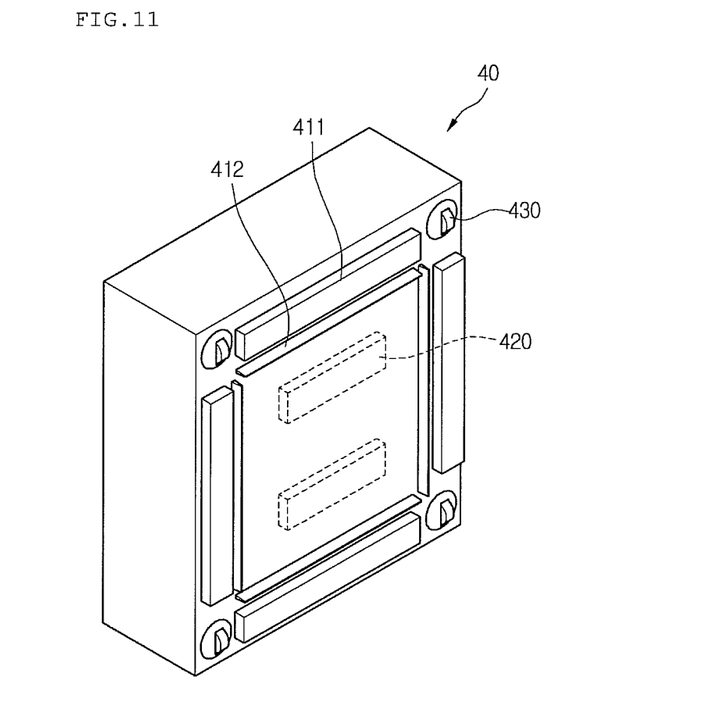
FIG. 11 is a perspective view illustrating a second movement part of an automatic vacuum cleaner according to a third embodiment of the present invention.

FIG. 11 is a perspective view illustrating a second movement part of an automatic vacuum cleaner according to a third embodiment of the present invention.

In this embodiment, a configuration of the second movement part is only different with that of the vacuum cleaner of the first embodiment, but the rest parts are identical with those of the first embodiment. Therefore, a characterized part of this embodiment will be only described hereinafter.

Referring to FIG. 11, in this embodiment, the second movement part 40 includes a first cleaning member 411, a second cleaning member 412, a magnetic member 420, and wheels 430.

The first cleaning member 411 may include a plurality of numbers, and since the location of the cleaning member is identical with that of the first embodiment, the detailed description is omitted. However, in this embodiment, the first cleaning member 411 is formed in the shape of a thin plate, unlike the first embodiment, and not rotated. The first cleaning member 411 is formed as textile materials to clean the one cleaning surface of the cleaning object when moving the second movement part.

The material and the location of the second cleaning member 412 are identical with those described in the first embodiment. The wheels 430 are intended to facilitate the movement of the second movement part.

According to the embodiment, since the structure for rotating the first cleaning member is unnecessary, there are advantages that the structure of the second movement part is simple and the weight is lighter.

Although preferred embodiments of the present invention have been illustrated and described, the present invention is not limited to the above-mentioned embodiments and various modified embodiments can be available by those skilled in the art without the scope of the appended claims of the present invention. In addition, these modified embodiments should not be appreciated separately from technical spirits or prospects.

According to the present invention, since the plurality of movement unit may be moved in a state attached to the cleaning surface, there is an advantage that the inclined cleaning surface can be cleaned.

In addition, when the cleaning object is disposed between the pluralities of movement parts, there is an advantage that the both sides of the cleaning subject can be cleaned.

In addition, since the movement speed of the vacuum cleaner or the operation speed of the cleaning member can be varied according to the foreign material amounts of the cleaning object, there is an advantage that the cleaning performance can be improved.

What is claimed is:

1. An automatic vacuum cleaner, comprising:
 a first movement module configured to move along a first surface of a panel, including when the panel is inclined;

a cleaner provided in the first movement module;

at least one fixed suction provided on a main body of the first movement module;

a first suction motor to provide a negative pressure to the fixed suction;

a plate rotatably coupled to the main body, the plate having first and second grooves;

a first driving motor that rotates the plate;

a first movable suction configured to move along the first groove based on an operation of a second driving motor; and a second movable suction configured to move along the second groove based on an operation of a third driving motor, wherein a second suction motor provides a negative pressure to the first movable suction and a third suction motor provides a negative pressure to the second movable suction.

2. The automatic vacuum cleaner according to claim 1, further comprising a controller to control movement of the plate, the first movable suction, and the second movable suction and to control negative pressure to the fixed suction, the first movable suction, and the second movable suction, wherein the vacuum cleaner moves along the first surface of the panel.

3. The automatic vacuum cleaner according to claim 2, further comprising a second movement module capable of moving along a second surface of the panel.

4. The automatic vacuum cleaner according to claim 3, wherein the first movement module communicates operation methods to the second movement module using a communication module.

* * * * *